United States Patent [19]

Kumagai

[11] Patent Number: 4,831,474
[45] Date of Patent: May 16, 1989

[54] DISK SUPPORTING MECHANISM IN DISK DRIVING DEVICE

[75] Inventor: Takeshi Kumagai, Kakuda, Japan
[73] Assignee: Alps Electric Co., Ltd., Japan
[21] Appl. No.: 111,460
[22] Filed: Oct. 20, 1987
[30] Foreign Application Priority Data Feb. 18, 1987 [JP] Japan .................... 62-23388[U]

[51] Int. Cl.$^4$ .............................................. G11B 5/012
[52] U.S. Cl. .................... 360/97.01; 369/270
[58] Field of Search .................... 360/97–99; 369/270–271; 403/1

[56] References Cited

U.S. PATENT DOCUMENTS

| | | | |
|---|---|---|---|
| 4,466,032 | 8/1984 | Saito I | 360/99 |
| 4,511,944 | 4/1985 | Saito II | 360/97 |
| 4,737,870 | 4/1988 | Okita | 360/97 |

*Primary Examiner*—John H. Wolff
*Assistant Examiner*—David J. Severin
*Attorney, Agent, or Firm*—Guy W. Shoup; Paul J. Winters; Stephen L. Malaska

[57] ABSTRACT

A disk driving apparatus is disclosed which, in such apparatus constituted of a disk holding portion on which a hub disposed in the center of a disk is loaded and a motor for supplying the disk holding portion with rotational power, comprises within the disk holding portion two members, a guide cap and a housing, externally attached to the outer rings of bearings fitted to the shaft of the motor. The guide cap is provided thereon with a centering peripheral surface with which the center hole of the hub is engaged and the housing is provided with portions for positioning parts which are attached thereto in the direction of the shaft of the disk.

2 Claims, 3 Drawing Sheets

DISK SUPPORTING MECHANISM IN DISK DRIVING DEVICE

BACKGROUND OF THE INVENTION

1. Field of the Invention

The present invention relates to a disk driving apparatus for positioning and rotatively driving a disk for an SVF system (STILL VIDEO FLOPPY SYSTEM) or the like.

2. Description of the Prior Art

FIG. 3 shows a disk cartridge 1 for an SVF system capable of recording and reproducing a still picture signal and a disk driving apparatus 10 for driving a disk within the cartridge 1. FIG. 4 shows in section a prior art disk driving apparatus 10 of the described type.

As shown in FIG. 4, in the cartridge 1 for a disk for the SVF system, there are made holes 2a and 2b in the center of a case 2, and between the holes 2a and 2b is provided a hub 3. The disk D received in the case 2 is fixed at its center to the hub 3, and on the underside of the periphery of this hub 3, there is provided a yoke 4 of a magnetic material for attraction by a magnet.

On the other hand, the disk driving apparatus 10 is formed of a disk holding portion 11 and a motor 12 as shown in FIG. 4. In this apparatus, a pair of ball bearings 15 are fixed at their inner rings to a shaft 14 which is fixed to a chassis 13, and to the outer rings of the ball bearings 15 is fixed a bearing housing 16. In this prior art example, the upper peripheral surface of the bearing housing 16 is made into a centering peripheral surface 16a. The centering peripheral surface 16a is dimensioned so as to fit in the center hole 3a of the hub 3 within the disk cartridge 1 with virtually no clearance left therebetween. In the SVF system, since the data track recorded on the disk D must be scanned by a magnetic head with high accuracy, the centering peripheral surface 16a is required to be controlled within the order of a $\mu$m in its rotational run-out tolerance and fit tolerance with the hub 3. At the upper end of the shaft 14, there is fixedly disposed a guide member 17. The underside of the guide member 17 is in abutment with the inner ring of the upper ball bearing 15, and the inner and outer rings of the upper and lower ball bearings 15 are provided with a pre-load in the direction of thrust by the guide member 17. Further, the peripheral surface of the guide member 17 is made into a taper surface 17a, and the center hole 3a of the hub 3 within the disk cartridge 1 is adapted to be guided by the taper surface 17a onto the above mentioned centering peripheral surface 16a. And, on the upper periphery of the bearing housing 16, there is disposed a center core 18, and on the interior of the upper portion of the center core 18 is disposed a hold magnet 19.

The yoke 4 formed integral with the hub 3 within the cartridge 1 is attracted by the hold magnet 19 so that the under side of the yoke 4 is brought into abutment with the upper side 18a of the center core 18. And, the center hole 3a of the hub 3 guided by the taper surface 17a is put on the centering peripheral surface 16a. Under such conditions, the disk D within the disk cartridge 1 is accurately positioned and held by the disk holding portion 11.

While there is provided a rotor magnet 22 fixed to a rotor 21 which is fixedly attached to the lower periphery of the bearing housing 16, there is provided a rotor yoke 25 fixed to the bearing housing 16 opposite to the rotor magnet 22. On the chassis 13, there is provided a base plate 23, and on this base plate 23 is mounted a stator coil 24 interposed between the rotor magnet 22 and the rotor yoke 25. In the motor 12, the rotor magnet 22 is rotatively driven by the current passed through the stator coil 24. And thereby, the hub 3 held at the upper portion of the bearing housing 16 is driven for rotation within the case 2 of the cartridge.

The case 2 of the cartridge as shown in FIG. 3 is provided with a shutter 5, and the disk D when the shutter 5 is open is exposed to outside so that the magnetic head (not shown) is enabled to make record or reproduction on the same.

Now, the hub 3 within the disk cartridge 1 is held by the centering peripheral surface 16a in the case of the above disk driving apparatus, and therefore, the centering peripheral surface 16a must be made of an excellent material in wear resistance. Since, however, the centering peripheral surface 16a has conventionally been formed integral with the bearing housing 16, it has been required in order to secure the wear resistance of the centering peripheral surface 16a that the entire bearing housing 16 is made of a wear resisting material. Further, the bearing housing 16 must be provided by machining with some positioning portions for attaching thereto the rotor 21, rotor yoke 25, and so on, in place, but when the housing has to be made of a hard material, the processability for providing such portions is deteriorated. Also, materials excellent in wear resistance are generally expensive, and therefore, it increases the manufacturing cost of the overall disk driving apparatus when the bearing housing 16 as a whole must be fabricated of such material.

SUMMARY OF THE INVENTION

The present invention was made to solve the above mentioned problems in the prior art, and a primary object of the present invention is to provided a disk driving apparatus in which the member for centering the hub which is disposed in the center of the disk and the bearing housing are formed in separate bodies, so that the bearing housing will be fabricated of a readily machinable material.

To achieve the aforementioned object, the present invention, in a disk driving apparatus constituted of a disk holding portion on which the hub disposed in the center of a disk is loaded and a motor for providing the disk holding portion with rotational power, is characterized in that it comprises within the disk holding portion two members, a guide cap and a housing, externally attached to the outer rings of bearings fitted to the shaft of the motor, wherein the guide cap is provided thereon with a centering peripheral surface with which the center hole of the hub is engaged and the housing is provided with portions for positioning parts to be attached thereto in the direction of the shaft of the disk.

According to the disk driving apparatus of the present invention, the guide cap for centering the hub and the housing to which a center core or the like are attached are formed in separate bodies. Accordingly, there is no need for the housing to perform the centering function and hence the housing can be fabricated of a readily machinable material. Further, since the guide cap and the housing are mutually positioned with high accuracy with reference to the peripheral surface of the same bearing, the relative position between the guide cap and the center core or the like can be precisely determined.

DESCRIPTION OF THE PREFERRED EMBODIMENT

An embodiment of the present invention will be described below with reference to the accompanying drawings.

Figure 1:
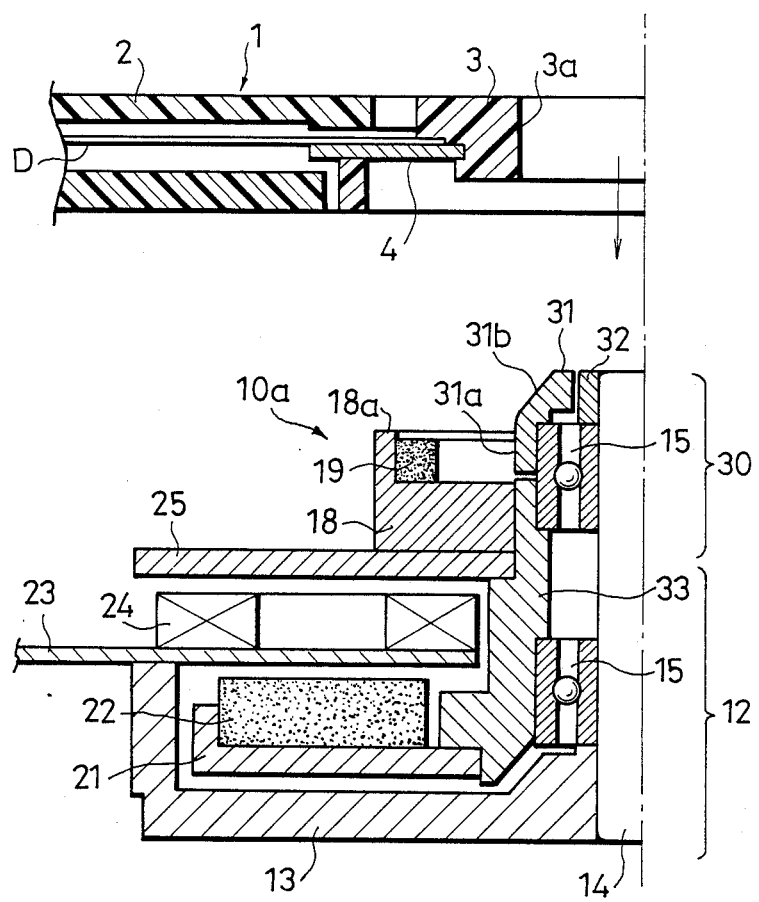
FIG. 1 is a partial enlarged sectional view of a disk driving apparatus according to the present invention and a cartridge.
Figure 2:
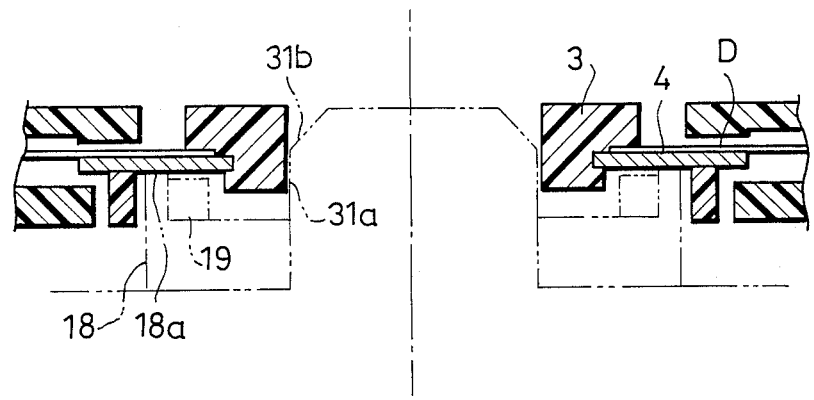
FIG. 2 is an enlarged sectional view of a cartridge loaded on a disk driving apparatus.

FIG. 1 is an enlarged sectional view of a cartridge and a disk driving apparatus and FIG. 2 is a sectional view of a disk driving apparatus loaded with a cartridge.

Figure 3:
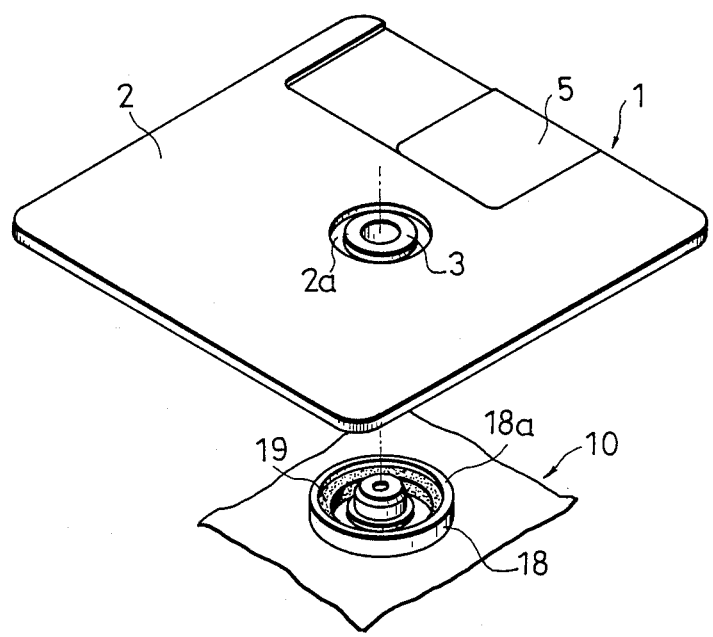
FIG. 3 is a perspective view of a cartridge and a disk driving apparatus.
Figure 4:
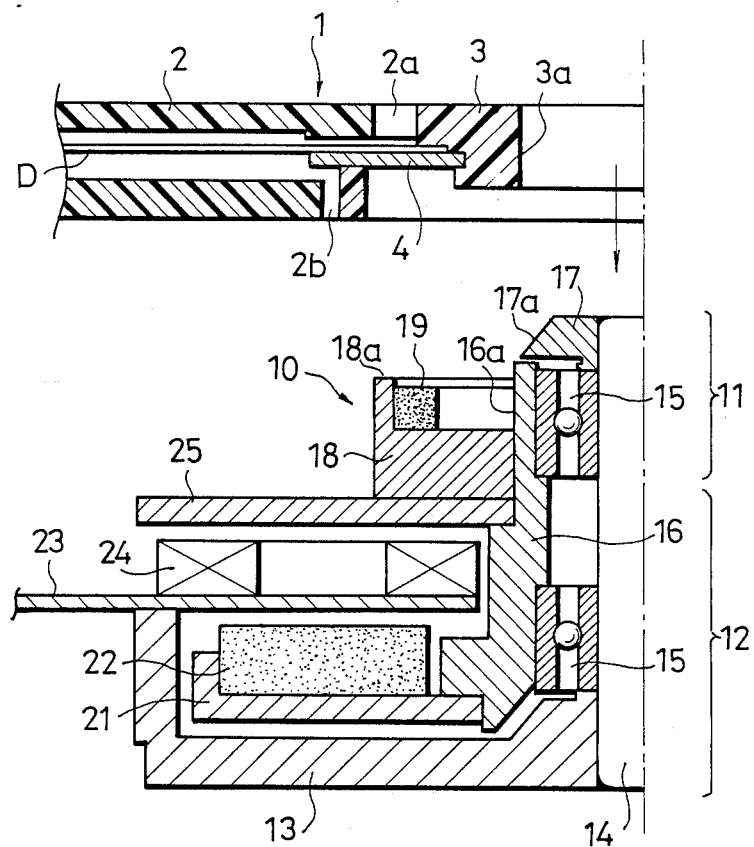
FIG. 4 is a partial enlarged sectional view of a disk driving apparatus of the prior art and a cartridge.

The disk cartridge 1 shown in FIG. 1 is that for the SVF apparatus the same as that shown in FIGS. 3 and 4. The internal structure consists of a hub 3 disposed within a case 1 for rotation, a disk fixed to the periphery of the hub 3, and a yoke 4 for attraction by a magnet.

On the other hand, the disk driving apparatus 10a according to the present invention consists of a disk holding portion 30 and a motor 12. While the motor 12 is of the same structure as the conventional one as shown in FIG. 4, the disk holding portion 30 is different from the disk holding portion 11 as shown in FIG. 4.

There are provided ball bearings 15 at the upper portion and lower portion of the shaft 14 which is fixed to the chassis 13, and to the outer rings of the ball bearings 15 is fixed a bearing housing 33. The bearing housing 33 is made shorter than the conventional one at its upper end portion, such that only the lower half of the outer ring of the upper ball bearing 15 is put in the bearing housing 33. Further, a guide cap 31 is put on the upper half of the outer ring of the upper ball bearing 15. The peripheral surface of the guide cap 31 is made into a centering peripheral surface 31a, and toward the upper end of the guide cap 31, there is formed a taper surface 31b in continuance from the centering peripheral surface 31a. Here, the guide cap 31 is disposed in place with reference to the peripheral surface of the outer ring of the upper bearing 15. the peripheral surface of a ball bearing 15 in general is fabricated with high precision such that its rotational run-out from the axis and other errors are minimized, and therefore, the guide cap 31 can be precisely positioned with reference to the axis of the shaft 14. Further, the centering peripheral surface 31a is fabricated, since it is to be fitted into the center hole 3a of the hub 3 in the center of the disk D, such that its rotational run-out and other errors may be minimized and the diametric size of the centering peripheral surface 31a is finished with high precision. Besides, the guide cap 31 is formed of an excellent material in wear resistance because the centering peripheral surface 31a must serve for holding the hub 3. At the upper end portion of the aforementioned shaft 14, there is fixed a pre-load ring 32 with its under side pressed against the inner ring of the ball bearing 15. The pre-load ring 32 is provided separate from the guide cap 31.

By the pre-load ring 32, the inner and outer rings of the upper and lower ball bearings 15 are given a pre-load in the direction of thrust.

Like in the conventional one, there are provided a center core 18 attached to the upper portion of the bearing housing 33 and a hold magnet 19 disposed on the interior of the upper portion of the center core 18.

The motor 12 is the same as conventional one, that is, there are provided a rotor magnet 22 supported on a rotor 21 and a rotor yoke 25 opposite thereto attached to the bearing housing 33 as well as a stator coil 24 mounted on a base plate 23 disposed on the chassis 13.

The operation for loading a cartridge on the disk driving apparatus will be described below.

When the disk cartridge 1 is to be loaded on the disk driving apparatus 10a as shown in FIG. 3, first, the center hole 3a of the hub 3 is guided by the taper surface 31b of the guide cap 31 and the center hole 3a is engaged with the centering peripheral surface 31a on the periphery of the guide cap 31. And, the yoke 4 provided in the hub 3 is attracted by the hold magnet 19 whereby the yoke 4 is brought into abutment with the upper side 18a of the center core 18. Under these conditions, the disk D and the hub 3 are positioned and held by the disk holding portion (refer to FIG. 2).

And the hub 3 and the disk D are rotatively driven by the power of the motor 12.

According to the disk driving apparatus of the present invention, the guide cap on which the centering peripheral surface is to be formed and the housing are formed in separate bodies, and therefore, while the guide cap is required to be fabricated of a wear resisting material, the housing can be fabricated of a readily machinable material, and thereby, the fabrication cost of the housing becomes lower than before and cost reduction can be achieved. Generally, the position on the peripheral surface of a ball bearing with respect to the center of the shaft is controlled to be very accurate according to standards, and therefore, it is enabled to precisely position the guide cap with respect to the axis. Further, since the guide cap and the housing are assembled with reference to the peripheral surface of the same bearing, the relative position between the centering peripheral surface formed on the guide cap and the center core disposed on the housing and the like can be determined with high precision.

What is claimed is:

1. A disk supporting mechanism in a disk driving device having a disk supporting part to which a hub arranged at a central part of the disk is fitted and a motor for applying a rotational force to the disk supporting part, the improvement in said disk supporting part comprising:

a guide cap formed with a centering circumferential surface being fitted to contact a central hole of said hub; and a housing defining portions for positioning in an axial direction parts to be attached thereto; wherein said guide cap and said housing are separate members and are outwardly fitted to an outer ring of a bearing whose inner ring is fitted to a chassis of the motor.

2. A disk supporting mechanism according to claim 1 wherein said guide cap is formed of a wear resisting material.

* * * * *